United States Patent
Drews-Nicolai et al.

(10) Patent No.: US 7,682,441 B2
(45) Date of Patent: Mar. 23, 2010

(54) WEATHER RESISTANT TITANIUM DIOXIDE PIGMENT AND A PROCESS FOR ITS PRODUCTION

(75) Inventors: Lydia Drews-Nicolai, Köln (DE); Siegfried Bluemel, Ratingen (DE)

(73) Assignee: Kronos International, Inc., Leverkusen (DE)

( * ) Notice: Subject to any disclaimer, the term of this patent is extended or adjusted under 35 U.S.C. 154(b) by 253 days.

(21) Appl. No.: 11/158,761

(22) Filed: Jun. 21, 2005

(65) Prior Publication Data

US 2006/0032402 A1 Feb. 16, 2006

(30) Foreign Application Priority Data

Jul. 31, 2004 (DE) .................. 10 2004 037 271

(51) Int. Cl.
*C09C 1/36* (2006.01)
*C04B 14/00* (2006.01)
(52) U.S. Cl. .................. 106/442; 106/436; 106/400
(58) Field of Classification Search ............ 106/287.34, 106/466, 38.3, 300, 400, 436, 442, 446; 516/90
See application file for complete search history.

(56) References Cited

U.S. PATENT DOCUMENTS

| | | | | |
|---|---|---|---|---|
| 2,913,419 A * | 11/1959 | Alexander | .................. | 516/80 |
| 3,928,057 A * | 12/1975 | DeColibus | .................. | 106/446 |
| 4,052,222 A * | 10/1977 | Howard | .................. | 106/438 |
| 4,075,031 A * | 2/1978 | Allen | .................. | 106/446 |
| 4,125,412 A * | 11/1978 | West | .................. | 106/446 |
| 4,199,370 A * | 4/1980 | Brand | .................. | 106/446 |
| 4,328,040 A * | 5/1982 | Panek et al. | .................. | 106/438 |
| 4,447,270 A * | 5/1984 | Howard et al. | .................. | 106/438 |
| 4,447,271 A * | 5/1984 | Howard et al. | .................. | 106/438 |
| 6,342,099 B1 * | 1/2002 | Hiew et al. | .................. | 106/443 |
| 6,656,259 B2 * | 12/2003 | Pfaff et al. | .................. | 106/415 |
| 6,695,906 B2 * | 2/2004 | Hiew et al. | .................. | 106/446 |
| 6,776,835 B2 * | 8/2004 | Andes et al. | .................. | 106/415 |
| 6,997,982 B2 * | 2/2006 | Pfaff et al. | .................. | 106/415 |

OTHER PUBLICATIONS

Dr. Helmut Weber, Silicic Acid as Component of Titanium Dioxide Pigments, FATIPEC Congress Book 1978, pp. 1-30, Kronos Titan-GMBH, Leverkusen, Germany.

* cited by examiner

*Primary Examiner*—Jerry Lorengo
*Assistant Examiner*—Shuangyi Abu Ali
(74) *Attorney, Agent, or Firm*—Locke Lord Bissell & Liddell, LLP

(57) ABSTRACT

The invention relates to a weather resistant titanium dioxide pigment with good optical properties having a $SiO_2$ dense skin doped with metal atoms. Particularly suitable elements for doping are tin, zirconium and titanium. The $SiO_2$ dense skin is composed of multiple layers whereby the innermost layer does not contain any significant quantity of metal atoms. The coating according to the invention is produced by adding the components to the alkaline suspension (pH at least 9) one after the other with a sliding pH. Complete formation of the doped $SiO_2$ dense skin requires that the pH subsequently be lowered to below 9. The pigment is particularly suitable for use in surface coatings and plastics.

23 Claims, No Drawings

US 7,682,441 B2

WEATHER RESISTANT TITANIUM DIOXIDE PIGMENT AND A PROCESS FOR ITS PRODUCTION

CROSS REFERENCE TO RELATED APPLICATIONS

This application claims priority from German Patent Application DE 10 2004 037 271.3 filed 31 Jul. 2004

FIELD OF THE INVENTION

The field of the invention is the field of weather resistant titanium dioxide pigment and a process for its production.

DETAILED DESCRIPTION OF THE INVENTION

Because of its high light refraction index, titanium dioxide is used as a high-grade pigment in many areas, such as plastics, coatings, paper and fibers. Because of its high scattering power, titanium dioxide imparts advantageous optical properties such as brightness, hiding power and tinting strength to such systems. However, titanium dioxide is photoactive, which means that, through the effect of ultraviolet radiation, free radicals form on the surface via electron-hole pairs, which free radicals can react with the substances in the surrounding matrix and destroy it. Weather resistant titanium dioxide pigments are therefore needed that either inhibit the formation of free radicals or prevent the free radicals, which do form, from reacting with the binder matrix. At the same time, the optical properties should, if at all possible, not be impaired.

One method frequently used to improve the weather resistance of $TiO_2$ pigments, i.e. to reduce the photocatalytic effect emanating from the titanium dioxide, is to coat the particles in a post-treatment process, e.g. with silicon oxide and/or zirconium oxide and/or aluminum oxide. Several patents describe the application of an amorphous coating of $SiO_2$ with the highest possible density—a so-called "dense skin"—to prevent the formation of free radicals on the particle surface.

U.S. Pat. No. 2,885,366 describes a method for covering a fine-grained substrate with a dense amorphous $SiO_2$ skin. It is important here that the fine-particle substrate does not consist of $SiO_2$, but that the surface has sufficient reactivity to accumulate a dense silica skin. It is not absolutely necessary that the entire particle consists of this reactive material, it is enough if only the surface is made of it. A variety of substrates have the necessary reactivity, for example metal oxides or metal silicates that are insoluble at a pH of 7 to 11. The application of the dense amorphous $SiO_2$ layer to a substrate of this kind is performed by adding active silica, i.e. $SiO_2$ with a low condensation level, at a pH of 8 to 11 and a temperature of 60 to 125° C. at a rate not in excess of value that can be calculated from a formula. This guarantees that the specific surface area of the particle, which is used as an indirect indicator of the continuity or quality of the skin, does not increase. Of fundamental importance in the process described in U.S. Pat. No. 2,885,366 are thus the slow rate of addition and the condition that the active silica is added in a pH range at which the amorphous silica layer precipitates immediately onto the substrate.

In addition to high weather resistance, it is important for $TiO_2$ pigments, especially when they are used in coating materials, that high opacity and high gloss are attained. However, according to U.S. Pat. No. Re. 27,818, pigments manufactured as described in U.S. Pat. No. 2,885,366 have certain deficits in this respect. U.S. Pat. No. Re. 27,818 states that an improvement can be brought about by applying a further layer of hydrous aluminum oxide after application of the dense amorphous $SiO_2$ skin. The procedure for doing this is to first apply the dense amorphous $SiO_2$ skin at a pH of 8 to 11 and then to add a water-soluble aluminum compound, keeping the pH below 7, and finally to adjust the suspension to a pH of 7 to 8.

According to U.S. Pat. No. 4,125,412, the big disadvantage of the above-mentioned process (U.S. Pat. No. Re. 27,818) is the long dosage time for lowering the pH after adding the silica. This very time-intensive process is a particular problem if the manufacturer wants to carry out the post-treatment as a continuous process. For this reason, an accelerated, and thus more economical post-treatment process for applying a dense $SiO_2$ and $Al_2O_3$ skin has been developed. Here, the sodium silicate is added quickly to a $TiO_2$ suspension at a temperature of 80-100° C., and the pH of the $TiO_2$ suspension can be made acidic or set to pH 9 to 10.5 before the addition, if desired. In both cases, a maturation process takes place at pH 9 to 10.5, after which an additional layer of an aluminum compound is applied.

The processes described above have the disadvantage that the precipitation of the $SiO_2$ dense skin must be carried out at very high temperatures to produce a skin that is as near to perfection as possible. EP 0 245 984 B1 (U.S. Pat. No. 4,781, 761) describes a post-treatment process, which, through the simultaneous addition of $Na_2SiO_3$ and a $B_2O_3$-containing solution to a $TiO_2$ suspension that has previously been set to a pH of 7 to 10.5, allows the post-treatment process to be carried out at a slightly lower temperature of 65 to 90° C., which is advantageous from a process engineering standpoint. The pH, which rises to 10.5 to 11.5 through the addition of the solutions, is subsequently lowered to around 8 through the addition of acid, e.g. HCl.

The aforementioned patents describe basic processes for producing a $SiO_2$ dense skin, various methods for shortening the post-treatment times, and processes for optimizing the dispersion behavior of $TiO_2$ pigments. Common to all these processes is that the post-treatment aims to produce a completely continuous $SiO_2$ skin that is as dense as possible to guarantee low photoactivity. They do not, however, describe any processes for further increasing the pigment stability or reducing photocatalytic activity.

One approach in this direction is described in U.S. 2003/0089278 A1. There, a process is also described for producing a $SiO_2$ dense skin pigment with an outer coating containing aluminum. Apart from improving the dispersion behavior, stability is also increased by adding citric acid before performing the dense $SiO_2$ skin surface treatment. The increase in stability is attributed to the combination of the $SiO_2$ dense skin with the aluminum-based post-treatment layer stabilized with citric acid.

$SiO_2$ dense skin treatments are mentioned not only in connection with $TiO_2$ pigments for improving their stability, but also, for example, in the coating of glass fibers to increase their resistance to abrasion and lower the slippage of the fibers in the manufactured products. In this context, U.S. Pat. No. 2,913,419 describes the precipitation of other polyvalent metal ions together with the silica on the particle surface. The main feature of this process is that the active silica and the metal salt solution are added to the suspension simultaneously but in separate streams, with the pH kept constant in the range 8 to 11 through the parallel addition of acids or alkalis, and that the mixing must be as thorough as possible during the parallel addition of the chemicals. The optimal method is considered to be adding the two solutions in a centrifugal pump carrying the $TiO_2$ suspension to be post-treated, for example. Furthermore, the specific surface area of the particles must not rise during the course of the treatment.

The process is used on a number of very fine-grained substrate materials with particle sizes of up to 100 nm, such as silica sol, metal or oxide powder, clay minerals, fibers etc. The treatment serves primarily to provide the substrate material with mechanical protection.

The object of the present invention is to create a weather resistant titanium dioxide pigment and to introduce a process by which the weather resistance—in particular the chalking resistance and gloss retention—of $SiO_2$ dense skin titanium dioxide pigments can be further improved while retaining good optical properties.

The object is achieved by means of a titanium dioxide pigment, in which the particles have a $SiO_2$ dense skin doped with metal atoms, whereby the $SiO_2$ dense skin is composed of multiple layers and whereby the innermost layer contains no significant quantity of metal atoms. The object is further achieved by means of process for manufacturing a titanium dioxide pigment in which the particles are coated with a dense silica skin doped with metal atoms, whereby the coating components are added to the suspension one after the other.

Other advantageous embodiments of the invention are described in the subclaims.

The subject matter of the invention is thus a coated titanium dioxide pigment, which has improved stability and is thus able to enhance the weather resistance and/or lightfastness of e.g. surface coatings or plastics while retaining good optical properties; application is not restricted to such systems, however.

The subject matter of the invention is furthermore a process for the manufacture of such a weather resistant titanium dioxide pigment in which a $SiO_2$ dense skin doped with metal atoms is applied by means of post-treatment in the aqueous phase, and also the use of this pigment in particular in surface coatings and plastics.

Hereinafter, the term "metal atoms" should also be understood to mean metal ions that are bound chemically or physically in the structure of the $SiO_2$ dense skin without the exact type of bonding being shown.

The weather resistance of a system pigmented with $TiO_2$ is generally described with the aid of various characteristic data. For example, the onset of chalking and the gloss retention (period until the gloss falls below the 50% residual gloss value) of pigmented coating systems are determined either after outdoor weathering at defined locations or after an accelerated weathering test (WOM).

Because these test procedures—particularly outdoor weathering—take a long time, use is frequently made of the continuity of the $SiO_2$ skin on the pigment particle surface to characterize weather resistance. It is assumed that weather resistance is related to the continuity of the $SiO_2$ skin covering the pigment particles. This relationship and processes for determining the quality (continuity) of the $SiO_2$ skin are described in the literature. The quality (continuity) of the $SiO_2$ skin can be determined indirectly by means of the $H_2SO_4$ solubility test (Dwight A. Holtzen et. al: "$TiO_2$ Photochemistry and Color Applications", DuPont White Pigment and Mineral Products, ANTEC 2001, p. 2374). The $H_2SO_4$ solubility test exploits the differing solubility of $TiO_2$ and $SiO_2$ in hot, concentrated sulfuric acid: The more continuous and more perfect the skin, the lower the $H_2SO_4$ solubility of the pigment particle.

A further characteristic for describing the quality of the skin is the change in the specific surface area (e.g. according to the Brunauer-Emmett-Teller process: BET) following post-treatment in comparison with the specific surface of the substrate.

According to the above-mentioned publication by the Dwight A. Holtzen et al., the behavior of the coating systems on outdoor weathering, shown by the gloss retention or chalking resistance, generally correlates with the results from the $H_2SO_4$ solubility testing. In this publication, a qualitative differentiation between the $TiO_2$ pigments is made in three categories according to their weather resistance.

Comparing the possible tests, preference should certainly be given to the accelerated weathering test (WOM) over the $H_2SO_4$ solubility test. With this kind of test, according to Michael P. Diebold ("Analysis and Testing—Unconventional Effects of $TiO_2$ on Paint Durability", published at www.coatings.de/articles/ecspapers/diebold/diebold.htm), preference should, in turn, be given to the test results for chalking stability over the residual gloss values for describing the weather resistance of $TiO_2$ pigments.

Surprisingly, it was found that pigments can be produced with much improved weather resistance even if the continuity of the $SiO_2$ dense skin is not particularly high and, furthermore, even if the $H_2SO_4$ solubility decreases with increasing accelerated weathering resistance. With the process according to the invention, this improvement in weather resistance compared with the prior art is achieved by the incorporation of metal atoms into the $SiO_2$ dense skin and by the special way of performing the post-treatment process. In particular, the metals Ti, Sn and Zr produce an improvement in weather resistance if incorporated in the $SiO_2$ dense skin. Aluminium is not used as a metal atom to be incorporated in the $SiO_2$ dense skin.

The coating according to the invention is produced by adding the components to the $TiO_2$ suspension one after the other at a sliding pH. The $TiO_2$ suspension is initially set at a pH of at least 9, preferably at least 10 and in particular at least 11. The pH is adjusted with an alkaline compound such as NaOH. Subsequently, the $SiO_2$ component is added, preferably as an alkali silicate solution, e.g. potassium or sodium silicate. This is followed by the addition of the metal component in the form of a metal salt solution, which may be alkaline or acidic. Normally, acidic components are used, e.g. titanyl chloride, zirconium sulfate, zirconium oxychloride, tin (II) chloride etc. A person skilled in the art will be aware of additional suitable compounds. It is also possible to add mixtures of metal salt solutions or different metal salt solutions one after the other. To ensure perfect formation of the $SiO_2$ dense skin doped with metal atoms, it is necessary to lower the pH to a value below 9 and preferably below 8. This is achieved either by addition of adequate acidic metal salt solution or by addition of additional metal salt free acids such as HCl or $H_2SO_4$. The precipitation of the $SiO_2$ dense skin including the metal components takes place at a pH>6.

In an alternative embodiment, the metal solution can first be added to the $TiO_2$ suspension, but the pH should not fall below 9 preferably not below 10 and in particular not below 11. After that, the silicate solution is added and the pH subsequently lowered to below 9 and preferably below 8.

The process according to the invention is characterized by the fact that a gradient is produced in the distribution of the metal atoms within the $SiO_2$ dense skin. If the silicate solution is added first, an initial layer of $SiO_2$ forms on the surface of the $TiO_2$ particles. This layer does not contain any significant quantity of the metal component. "No significant quantity" is understood to mean a quantity which does not modify the properties of the product and which has not been added on purpose. During the subsequent addition of the metal salt solution, further silica is precipitated together with the metal component on top of the first $SiO_2$ layer to form a mixed layer of $SiO_2$ and metal. Lowering the pH to below 9 after addition of the metal salt solution by means of a metal salt free acid results in the remainder of the silica becoming deposited on the particle surface.

The optical properties of the pigment, such as tinting strength, dispersing behavior etc., can be improved by means of the application of an additional hydrous aluminum oxide skin. The precipitation of an hydrous aluminum oxide skin of this kind can be carried out at a fixed pH in the range of 3.5 to 10.0 or with changing pH. Sodium aluminate, for example, is a good starting substance, and HCl is particularly suitable for adjusting the pH during precipitation of the hydrous aluminum oxide skin.

The dense skin on the particle surface of the pigments according to the invention contain 2.0 to 6.0% by weight, preferably 2.5 to 4.0% by weight $SiO_2$, and 0.1 to 3.0% by weight, preferably 0.1 to 1.0% by weight metal, calculated as oxide and calculated on the total pigment. In a preferred embodiment, the particles are additionally coated with a layer of 0.1 to 6.0% by weight, preferably 1.0 to 4.0% by weight hydrous aluminum oxide, calculated as $Al_2O_3$.

EXAMPLES

The invention is described in greater detail with reference to the following examples, but without restricting the scope of the invention as a result.

The process according to the invention starts with a $TiO_2$ base material produced by the chloride or sulfate process. A mixture of the base material types can also be used. $TiO_2$ base material is understood to mean $TiO_2$ particles which have not yet been post-treated. The photostability of the basic base material, which is determined by the crystal modification— rutile or anatase—of the base material and may be further enhanced by doping with substances like Al, Cr etc., defines the initial level of weather resistance of the pigment, which the process according to the invention aims to improve.

The base material may initially be ground, e.g. in a wet grinding process. A dispersing agent, which can be a polyphosphate, polyacrylate or any other dispersing agent known to a person skilled in the art, is preferably added during wet grinding.

The pH of the starting suspension is adjusted with acid (e.g. HCl) or alkali (e.g. NaOH) to a pH of at least 9, in a preferred embodiment to at least 10 and in a particularly preferred embodiment to at least 11.

Example 1

A wet-ground rutile $TiO_2$ suspension from the chloride process containing 5 kg base material with a concentration of 350 g/L is heated to 80° C. and set to a pH of 11.5 with NaOH. 3.0% by weight $SiO_2$ in the form of potassium silicate is added within 30 minutes. After a retention time of 10 minutes, the pH is lowered to 4 within 150 minutes through the addition of HCl. After stirring for 10 minutes, 3.0% by weight $Al_2O_3$ in the form of sodium aluminate is added together with HCl within 30 minutes so that the pH remains constant at approx. 4 during this parallel addition.

The pH of the suspension is set to 6.5 to 7 through NaOH and the material is then filtered, washed and dried as normal in practice, and comminuted with a steam jet mill with the addition of TMP (trimethylolpropane).

Example 2

A wet-ground rutile $TiO_2$ suspension from the chloride process containing 5 kg base material with a concentration of 350 g/L is heated to 80° C. and set to a pH of 11.5 with NaOH. 3.0% by weight $SiO_2$ in the form of potassium silicate is added within 30 minutes. After a retention time of 10 minutes, the pH is lowered to 4 within 150 minutes through the addition of 0.2% by weight $TiO_2$ in the form of titanium oxychloride together with HCl. Treatment continues as described in Example 1.

Example 3

As Example 2, except that 0.4% by weight $TiO_2$ is added in the form of titanium oxychloride.

Example 4

As Example 2, except that 0.6% by weight $TiO_2$ is added in the form of titanium oxychloride.

TABLE 1

| Example | Metal doping [% by. wt.] | Onset of chalking [days] | Gloss retention [days] | $H_2SO_4$ solubility [% by wt. $TiO_2$] | BET [$m^2$/g] |
|---|---|---|---|---|---|
| 1 | — | 16.5 | 19.5 | 2.1 | 15.1 |
| 2 | 0.2 $TiO_2$ | 19.5 | 21.5 | 4.4 | 14.1 |
| 3 | 0.4 $TiO_2$ | 20 | 22 | 6.4 | 18.1 |
| 4 | 0.6 $TiO_2$ | 20 | 22 | 9.4 | 17.4 |

Example 5

A wet-ground rutile $TiO_2$ suspension from the chloride process containing 7 kg base material with a concentration of 350 g/L is heated to 7° C. and set to a pH of approximately 11.5 with NaOH. 3.0% by weight $SiO_2$ in the form of sodium silicate is added within 30 minutes. After a retention time of 15 minutes, the pH is lowered to 7.5 within 200 minutes through the addition of HCl. After stirring for 10 minutes, add 1.5% by weight $Al_2O_3$ in the form of sodium aluminate together with HCl within 30 minutes in such a way that the pH remains constant at approximately 7.5 during this parallel addition.

The pH of the suspension is set to approximately 5.5 through HCl and the material is then filtered, washed and dried as normal in practice, and comminuted with a steam jet mill with the addition of TMP.

Example 6

A wet-ground rutile $TiO_2$ suspension from the chloride process containing 7 kg base material with a concentration of 350 g/L is heated to 75° C. and set to a pH of approximately 11.5 with NaOH. 3.0% by weight $SiO_2$ in the form of sodium silicate is added within 30 minutes. After a retention time of 15 minutes, 0.5% by weight $TiO_2$ in the form of titanium oxychloride solution is added within 150 minutes. The pH is then lowered to 7.5 within 50 minutes through the addition of HCl. After stirring for 10 minutes, 1.5% by weight $Al_2O_3$ in the form of sodium aluminate is added together with HCl within 30 minutes so that the pH remains constant at approximately 7.5 during this parallel addition.

Treatment continues as described in Example 5.

Example 7

A wet-ground rutile $TiO_2$ suspension from the chloride process containing 7 kg base material with a concentration of 350 g/L is heated to 75° C. and set to a pH of 11.5 with NaOH. 3.0% by weight $SiO_2$ in the form of sodium silicate is added within 30 minutes. After a retention time of 15 minutes, 0.6% by weight $ZrO_2$ in the form of zirconium sulfate solution is added within 150 minutes. The pH is then lowered to 7.5 within 130 minutes through the addition of HCl. After stirring for 10 minutes, 1.5% by weight $Al_2O_3$ in the form of sodium aluminate is added together with HCl within 30 minutes so that the pH remains constant at approximately 7.5 during this parallel addition.

Treatment continues as described in Example 5.

Example 8

A wet-ground rutile $TiO_2$ suspension from the chloride process containing 7 kg base material with a concentration of 350 g/L is heated to 75° C. and set to a pH of 11.5 with NaOH. 3.0% by weight $SiO_2$ in the form of sodium silicate is added within 30 minutes. After a retention time of 15 minutes, 0.5% by weight $SnO_2$ in the form of tin (II) chloride solution is added within 90 minutes. The pH is then lowered to 7.5 within 120 minutes through the addition of HCl. After stirring for 10 minutes, 1.5% by weight $Al_2O_3$ in the form of sodium aluminate is added together with HCl within 30 minutes so that the pH remains constant at approximately 7.5 during this parallel addition.

Treatment continues as described in Example 5.

TABLE 2

| Example | Metal doping [% by. wt.] | Onset of chalking [days] | Gloss retention [days] | $H_2SO_4$ solubility [% by wt. $TiO_2$] | BET [m²/g] |
|---|---|---|---|---|---|
| 5 | — | 15 | 17.5 | 2.8 | 10.1 |
| 6 | 0.5 $TiO_2$ | 18 | 19 | 6.6 | 12.9 |
| 7 | 0.6 $ZrO_2$ | 17.5 | 18.5 | 6.2 | 15.1 |
| 8 | 0.5 $SnO_2$ | 24.5 | 19 | 1.5 | 10.3 |

Example 9

A wet-ground rutile $TiO_2$ suspension from the chloride process containing 7 kg base material with a concentration of 350 g/L is heated to 75° C. and set to a pH of 10 with NaOH. 3.0% by weight $SiO_2$ in the form of sodium silicate is added within 30 minutes. After a retention time of 15 minutes, 0.5% by weight $SnO_2$ in the form of tin (II) chloride solution is added within 90 minutes. The pH is lowered to 7.5 within 25 minutes through the addition of HCl.

During the addition of the sodium silicate, suspension samples are taken after the addition of about ⅓, ⅔ and the total amount of $SiO_2$ and during the addition of the $SnCl_2$ solution after the addition of about ⅓, ⅔ and the total quantity of $SnCl_2$ calculated as $SiO_2$. The samples are centrifuged without making any further changes to prevent further precipitation. In particular, the pH is not adjusted and the material is not washed. The material is dried in a drying cabinet at 160° C., milled and analyzed for $SiO_2$ and $SnO_2$ using X-ray fluorescence (XRF).

The results of the analyses are shown in Table 3. The results show a multiple layered $SiO_2$ skin being formed comprising an inner layer made of approximately 50% of the sodium silicate added and a subsequent mixed layer made of $SiO_2$ and $SnO_2$.

TABLE 3

(Quantities in % by weight)

| | Procedural steps | | | | | | |
|---|---|---|---|---|---|---|---|
| | Addition of sodium silicate | | | Addition of $SnCl_2$ | | | Lowering of pH |
| pH Suspension | 10 | | | → ca. 9.5 | | | → 7.5 |
| $SiO_2$ total addition | 1.0 | 2.1 | 3.0 | | | 3.0 | |
| $SiO_2$ on particle suface | 0.7 | 1.1 | 1.4 | 1.7 | 2.2 | 2.6 | 3.0 |
| $SnO_2$ total addition | | | | 0.14 | 0.33 | 0.50 | |
| $SnO_2$ on particle surface | | | | 0.10 | 0.32 | 0.50 | 0.50 |

Test Methods

Photostability (Chalking/Gloss Retention):

The photostability of the example pigments produced is tested in an alkyd resin coating system exposed to accelerated weathering. The weathering is performed in a Weather-Ometer (WOM), a weathering device comprising a ventilated test chamber with a.) radiation source (carbon electrodes that generate an electric arc in operation)

b.) radiation filter of special glass c.) device for spraying the specimens with water d.) atomizer for generating humidity e.) rotating sample holder During the test cycle, outdoor weathering is simulated in accelerated time. The coating weathers during the test period, and the chalking resistance and gloss retention are measured. Ideally, only specimens from the same test cycle are compared with another.

Chalking is measured in accordance with DIN 53159. This involves pressing a piece of black wet photo paper onto the surface of the chalked paint. The day on which the pigment and filler particles leave behind a complete white impression is taken as the onset of chalking (chalking resistance). Gloss retention is determined by the daily measurement of the gloss with a haze gloss reflectometer. The time is given in days after which the gloss has dropped to 50% of its initial value. With samples from the same test cycle, the absolute values (in days) of the chalking resistance and gloss retention can be directly compared.

$H_2SO_4$ Solubility:

A suspension of 500 mg pigment in 25 mL concentrated sulfuric acid (96%) is held at 75° C. for 60 minutes. After filtration, the dissolved $TiO_2$ in the filtrate is measured by ICP atomic emission spectrometry (ICP-AES). The lower the concentration of the dissolved $TiO_2$, the denser the $SiO_2$ skin on the pigment surface.

Specific Surface According to Bet (Brunauer-Emmett-Teller):

The BET surface area is measured according to the static volumetric principle using a Micromeritics Tristar 3000.

Test Results

The test results are summarized in Tables 1 and 2. Examples 1 to 4 were subjected jointly to one weathering cycle, as were Examples 5 to 8. Compared with the pigments having an undoped $SiO_2$ dense skin (Examples 1 and 5), the pigments with a doped $SiO_2$ dense skin (Examples 2 to 4 and 6 to 8) have significantly better weather resistance (chalking resistance and gloss retention). The best results are achieved with tin.

It can also be seen that, surprisingly, the weather resistance of the pigments does not correlate with the continuity of the skin—indicated as the $H_2SO_4$ solubility.

Furthermore, it is shown that the specific surface area according to BET compared with that of the untreated base material (BET 6.5 $m^2/g$) increases both with a pure $SiO_2$ coating and with the treatment according to the invention, but without any correlation with the weather resistance.

Obviously, many modifications and variations of the present invention are possible in light of the above teachings. It is therefore to be understood that, within the scope of the appended claims, the invention may be practiced otherwise than as specifically described. All US patents, patent applications, and publications referred to herein are hereby incorporated by reference.

We claim:

1. A material, comprising:
   Titanium dioxide pigment particles, the TiO2 pigment particles having a surface, wherein two or more layers are deposited on the TiO2 pigment surface, and wherein at least one of the two or more layers is a dense SiO2 layer comprising SiO2 containing no significant quantity of metal atoms other than silicon, and wherein at least one of the two or more layers is a dense SiO2 layer comprising SiO2 containing a significant quantity of metal atoms other than silicon, and wherein the specific surface according to BET of the material is greater than the specific surface area of the titanium dioxide particles.

2. The material of claim 1, wherein the dense SiO2 layer comprising SiO2 containing no significant quantity of metal atoms other than silicon is attached directly to the titanium dioxide pigment particles.

3. The material of claim 2, wherein the dense SiO2 layer containing a significant quantity of metal atoms other than silicon contains 0.1 to 3% by weight-metal calculated as oxide on total pigment.

4. The material of claim 1, wherein the particles have an outer layer of hydrous aluminum oxide.

5. The material of claim 4, wherein the particles have an outer layer containing 0.5 to 6% by weight Al2O3 calculated on total pigment.

6. The material of claim 1, wherein the dense SiO2 layer containing a significant quantity of metal atoms other than silicon is doped with tin, zirconium or titanium or mixtures thereof.

7. The material of claim 1, wherein the dense SiO2 layers comprising SiO2 contain in total 2.0 to 6.0% by weight SiO2 calculated on total pigment.

8. The material of claim 1, wherein the material is incorporated in surface coatings or plastic.

9. A method comprising:
   a) adding a first material containing silicon to a suspension of titanium dioxide pigment particles, wherein the first material contains no significant quantity of a metal other than silicon; then
   b) adding a second material containing a metal other than silicon to the suspension of TiO2 particles, wherein the second material is added after a dense layer of undoped SiO2 has formed on the TiO2 particles, and wherein the addition of the second material results in a dense layer of doped SiO2 deposited upon the dense layer of undoped SiO2;
   wherein after performing step a) and step b) the specific surface according to BET of the particles is increased.

10. The method of claim 9, wherein the second material contains tin, zirconium or titanium or mixtures thereof.

11. The method of claim 9, wherein a final layer of hydrous aluminum oxide is deposited on the surface.

12. The method of claim 9, wherein the pH of the suspension of titanium dioxide pigment particles at the beginning of adding the first and the second material is at least 9.

13. The method of claim 9, wherein, after adding the second material, the pH of the suspension is lowered to below 9.

14. The method of claim 9, further comprising:
   Incorporating the material in surface coatings or plastics.

15. A material, comprising:
   Titanium dioxide pigment particles, the TiO2 pigment particles having a surface, wherein the TiO2 pigment particles have a SiO2 dense skin composed of multiple layers, and wherein the innermost layer of the SiO2 dense skin does not contain any significant quantity of metal atoms other than silicon, and wherein at least one layer of the SiO2 dense skin is doped with a significant quantity of metal atoms other than silicon, and wherein the specific surface according to BET of the material is greater than the specific surface area of the titanium dioxide particles.

16. The material of claim 15, wherein the innermost layer of the SiO2 dense skin is attached directly to the titanium dioxide particles.

17. The material of claim 15, wherein the dense SiO2 layer containing a significant quantity of metal atoms other than silicon contains 0.1 to 3.0% by weight metal calculated as oxide on total pigment.

18. The material of claim 15, wherein the particles have an outer layer of hydrous aluminum oxide.

19. The material of claim 18, wherein the particles have an outer layer containing 0.5 to 6.0% by weight Al2O3 calculated on total pigment.

20. The material of claim 15, wherein the dense SiO2 layer containing a significant quantity of metal atoms other than silicon contains tin, zirconium or titanium or mixtures thereof.

21. The material of claim 15, wherein the SiO2 dense skin composed of multiple layers contains 2.0 to 6.0% by weight SiO2.

22. The material of claim 15, wherein the material is incorporated in surface coatings or plastic.

23. The method of claim 9, wherein, after step a) a significant quantity of silicon remains in suspension when the second material is added in step b), and wherein no silicon is contained in the second material, and wherein the pH of the suspension is reduced during the addition of the second material, resulting in the coprecipitation of the metal other than silicon and the silicon remaining in the solution to produce a dense layer of doped silicon upon the layer of undoped silicon.

* * * * *